April 1, 1969     C. H. UTLEY ET AL     3,436,070
JIG FOR ELECTRICAL OUTLET BOXES
Filed May 31, 1966
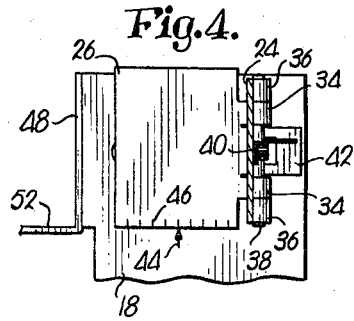
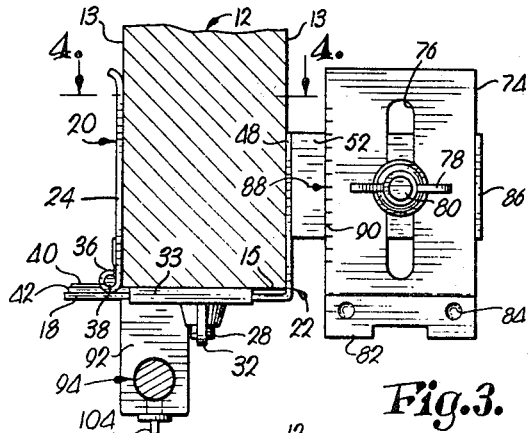
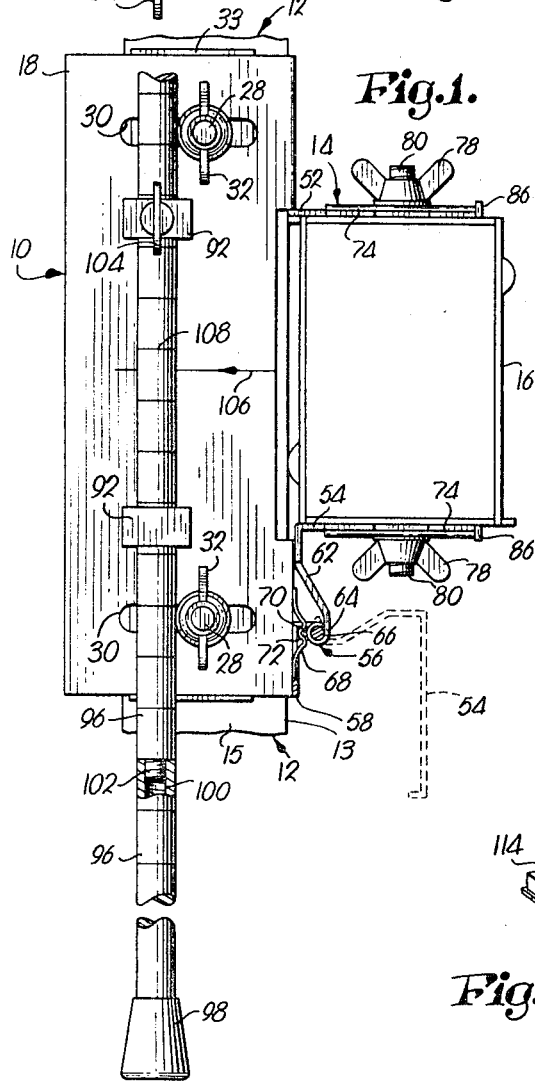
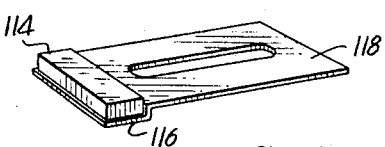
INVENTORS.
Charles H. Utley
Jerry R. Sanson
BY
*Hovey, Schmidt, Johnson & Hovey*
ATTORNEYS.

3,436,070
JIG FOR ELECTRICAL OUTLET BOXES
Charles H. Utlev, R.F.D. 1, Rayville, Mo. 64084, and Jerry R. Sanson, Polo, Mo. 64671
Filed May 31, 1966, Ser. No. 553,888
Int. Cl. B25b *11/00, 1/00;* B23q *3/02*
U.S. Cl. 269—8                                    5 Claims

ABSTRACT OF THE DISCLOSURE

A jig for supporting an electric outlet box is releasably attached to a stud by a pair of spaced wings relatively biased toward each other and the jig has an adjustable support for holding the outlet box at a selected position during mounting of the box to the stud comprising a pair of brackets, each with a shiftable adjustment plate for carrying the box and retaining means such as a magnet on each of the plates for preventing relative movement of the outlet box.

---

This invention relates to structure for use in installing electrical outlet boxes on building studs and, more particularly, to a jig for supporting an outlet box in the proper horizontal and vertical positions with respect to a face of the stud.

It is the primary object of this invention to provide a jig for the above described purpose, wherein the jig and supported box are releasably attached to the stud for installation, to the end that an operator will have both hands free for mounting the box with suitable fastening means. The jig will not slip from its attached position and thus the operator will not have to frequently realign the unit.

It is another object of the instant invention to provide a jig for electrical outlet boxes wherein adjustment means is provided so that a supported box is automatically positioned at the desired height and is set outwardly from the stud at a distance equal to the thickness of the wall material which is to be subsequently secured to the stud.

In the drawing:

FIGURE 1 is a fragmentary, front elevational view of a jig made pursuant to the present invention showing the same attached to a building stud, parts being broken away and in section to reveal details of construction;

FIG. 2 is a side elevational view thereof, parts being broken away and in section for clarity;

FIG. 3 is a horizontal, cross-sectional view through the stud, showing the top of the jig;

FIG. 4 is a cross-sectional view taken along line 4—4 of FIG. 3, the jig being removed from the stud; and FIG. 5 is a perspective view of an alternative adjustment means for the jig.

The jig of the present invention includes a fixture 10 adapted to be releasably attached to a stud 12 which normally extends vertically from the floor to the ceiling of a building and thereby presents opposed side faces 13, a front face 15, and a rear face (not shown). A support 14 extends laterally from fixture 10 for carrying an electrical outlet box 16.

Fixture 10 includes a clamp formed from a rectangular main panel 18 having a pair of opposed, rearwardly extending wings 20 and 22. Wing 20 is divided into a pair of hinged wing sections 24 disposed adjacent the top and bottom of panel 18, and each section 24 is provided with an adjustment plate element 26 facing the rear surface of panel 18. A stud bolt 28 extends from each plate element 26 through a corresponding horizontal slot 30 in panel 18 and is releasably secured to the latter by a wing nut 32. A lip 33 extends from each element 26 over the top and bottom edges of panel 18, respectively.

Referring to FIG. 4, each element 26 has a pair of spaced support barrels 34 disposed in alignment between pivot barrels 36 which are formed in the proximal end of wing section 24. A pin 38 extends through barrels 34 and 36 to swingably mount wing section 24, there being a spring 40 coiled about pin 38 and bearing against wing section 24 and the extension 42 of plate element 26. An indicator arrow 44 on panel 18 is disposed adjacent stud-width indicia 46 on element 26.

Wing 22 is divided into a pair of stationary wing sections 48 and 50 adjacent the upper and lower ends of panel 18 and presenting a space 51 therebetween (FIG. 2). An upper bracket 52 is rigidly secured to the lower edge of wing section 48 and extends laterally therefrom, and a lower bracket 54 is pivotally secured to wing section 50 by hinge structure 56.

Hinge structure 56 includes a U-shaped barrel plate 58 secured to wing section 50 and has a pair of spaced barrels 60 formed in the legs thereof. Lower bracket 54 has a link 62 depending therefrom, the link terminating in a tube 64 aligned between barrels 60 and pivotal with respect thereto about a pin 66. An M-shaped spring clip 68 is secured to wing section 50 adjacent tube 64, the latter having a rib 70 adapted for complemental fitting in the depression 72 formed in spring clip 68.

Brackets 52 and 54 are each provided with an adjustment plate 74 having an elongated slot 76 extending parallel to wing 22, plate 74 being releasably secured to the corresponding bracket by a wing nut 78 threadably received by a stud bolt 80 extending from the bracket.

Each adjustment plate 74 has an inwardly offset portion 82 at its forward edge, the portion having inwardly extending conical projections 84 adapted for alignment with openings in outlet box 16. Each bracket has a lip 86 at its outer end extending along the proximal edge of the corresponding adjustment plate 74. An indicator arrow 88 on top bracket 52 is disposed for alignment with box-depth indicia 90 on plate 74 (FIG. 3). Lower bracket 54 has similar indicating means (not shown).

A pair of spaced-apart guides 92 extend forwardly from main panel 18 and telescopically receive a pole 94 which is divided into three rods 96. Lower rod 96 has a foot 98 and is provided with internal threads 100 at its uppermost end which are adapted to receive the threaded extension 102 of central rod 96. The top rod is similarly coupled to the central rod and the pole 94 is maintained in the desired vertical position by a setscrew 104 extending through upper guide 92. An indicator arrow 106 is provided on panel 18 for alignment with the height indicia 108 on pole 94.

In use, the jig is adjusted for the particular width of stud 12 by releasing wing nuts 32 to shift plate elements 26 toward or away from wing 22 until the proper width is indicated by arrow 44. As each element 26 is shifted, lip 33 guides the element along the proximal edge of main panel 18. The horizontal position of box 16 with respect to side face 13 of stud 12 is governed by the adjustment of plates 74 which is effected by releasing wing nuts 78 for shifting along lips 86, the selected position being indicated by arrows 88 and indicia 90. Height adjustment is effected by releasing setscrew 104 and shifting pole 94 until the selected height is indicated on indicia 108 by arrow 106.

To place outlet box 16 in support 14, lower bracket 54 is swung downwardly about pin 66 to release rib 70 from depression 72, as shown by the dashed-line portion of FIG. 1. Box 16 is aligned with projections 84 on upper bracket 52, and lower bracket 54 is returned to its normal lateral carrying position as shown in the full-line portion of FIG. 1, with rib 70 returning to depression 72 to maintain box 16 in support 14. It will be noted from viewing FIG. 2, that outlet box 16 is aligned with space 51 and engages brackets 52 and 54 and portions 82 of plates 74 which are suitably offset for alignment with the brackets.

To attach fixture 10 to stud 12, hinged wing sections 24 are drawn away from wing 22 and fixture 10 moved forwardly until panel 18, wings 20 and 22 releasably embrace the corresponding faces 15 and 13 of stud 12. Since spring-loaded wing sections 24 are biased toward wing 22, wings 20 and 22 serve as a clamp to yieldably grip the opposed faces 13 of stud 12.

Fixture 10 is shifted downwardly along stud 12 until foot 98 engages the floor surface of the building, whereupon outlet box 16 is automatically positioned adjacent proximal side face 13 at the selected height and extending outwardly a selected distance from front face 15 of stud 12. Since box 16 is releasably attached to stud 12, an operator will have both hands free to insert nails or other suitable fasteners through apertures in box 16 to install the latter on stud 12. An explosive nail-driving device could be integrated with the jib for greatly increasing the speed of installation.

To release the jig from stud 12, lower bracket 54 is swung downwardly, and fixture 10 drawn upwardly and outwardly to remove support 14 from box 16. The jig may then be used for the next installation, and since all electrical outlets are normally placed in the same relative positions, the jig will not have to be readjusted. Of course, the height would have to be adjusted since wall plugs are normally placed about 16 inches above the floor, while light switches are placed about 52 inches above the floor. Thus, pole 94 should be sufficiently long to permit accurate positioning at these heights.

After the outlet boxes are installed, the wall material is secured to the front face 15 of stud 12 and suitable openings are provided in the material for clearing the outlet boxes. The outer edges of the boxes will be flush with the mounted wall material since each box extends forwardly from the corresponding face 15 at a distance equal to the thickness of the wall material. This distance was preselected by adjustment of plates 74, the distance being indicated by arrows 88 and indicia 90.

It will be appreciated that conical projections 84 serve as retaining means for standard outlet boxes having corresponding openings provided for fitting over the projections. An alternate retaining means is illustrated in FIG. 5 and is in the form of a magnet 114 mounted on the outwardly offset portion 116 of an adjustment plate 118. Plate 118 could thus be substituted for adjustment plate 74 whereby the exposed main face of magnet 114 would be aligned with the corresponding bracket of support 14. The magnetic retaining means would serve to maintain any metallic outlet box 16 in proper position in support 14.

Having thus described the invention, what is claimed as new and desired to be secured by Letters Patent is:

1. A jig for holding an electrical outlet box in a selected position for mounting of the box to a building stud, said jig comprising:
   a fixture adapted to be releasably attached to said stud, and including a clamp having first and second opposed structures for gripping corresponding opposed portions of the stud,
   a support for said box carried by the fixture and disposed to maintain the box against one face of the stud during said mounting,
   said first structure including upper and lower clamping members presenting a space therebetween,
   said support including a pair of brackets extending laterally from corresponding members for supporting the box therebetween in alignment with said space, a shiftable adjustment plate on each bracket for carrying the box, and means securing each plate to the corresponding bracket to permit movement of the plate parallel to the structures to thereby vary the horizontal position of a supported box with respect to said stud.

2. The invention of claim 1, and means adjustably mounting one of said structures on said fixture to vary the spacing thereof with respect to the other structure, and a vertical pole having height indicating indicia thereon, there being means releasably securing said pole to said fixture for positioning a supported box at a selected height on the stud.

3. The invention of claim 1, there being retaining means on the plates for precluding relative movement of a supported box.

4. The invention of claim 3, said retaining means comprising a magnet.

5. A jig for holding an electrical outlet box in a selected position for mounting of the box to a building stud, said jig comprising:
   a fixture adapted to be releasably attached to said stud, and including a clamp having first and second opposed structures for gripping corresponding opposed portions of the stud,
   a support for said box carried by the fixture and disposed to maintain the box against one face of the stud during said mounting,
   said first structure including upper and lower clamping members presenting a space therebetween,
   said support including a pair of brackets extending laterally from corresponding members for supporting the box therebetween in alignment with said space, and
   hinge means swingably mounting one of said brackets on the fixture and normally maintaining said one bracket in its laterally extending, box-supporting disposition.

References Cited

UNITED STATES PATENTS

| 2,919,913 | 1/1960 | Phair | 269—50 |
| 2,956,798 | 10/1960 | Briggs | 269—76 |
| 2,962,281 | 11/1960 | Hodgson | 269—77 |
| 2,990,172 | 6/1961 | Gianotta | 269—50 |
| 3,154,304 | 10/1964 | Crawford | 269—254 X |

LESTER M. SWINGLE, *Primary Examiner.*

JAMES F. McKEOWN, *Assistant Examiner.*

U.S. Cl. X.R.

29—203; 33—180; 269—95, 254, 309